US005400248A

United States Patent [19]

Chisholm

[11] Patent Number: 5,400,248

[45] Date of Patent: Mar. 21, 1995

[54] COMPUTER NETWORK BASED CONDITIONAL VOTING SYSTEM

[75] Inventor: John D. Chisholm, 140 Sand Hill Circle, Menlo Park, Calif.

[73] Assignee: John D. Chisholm, Menlo Park, Calif.

[21] Appl. No.: 122,869

[22] Filed: Sep. 15, 1993

[51] Int. Cl.[6] .................... G06F 15/20; G06F 15/30

[52] U.S. Cl. .................... 364/409; 235/386

[58] Field of Search .............. 364/401, 402, 407, 409; 235/386, 456, 51, 385

[56] References Cited

U.S. PATENT DOCUMENTS 4,641,241 2/1987 Boram .................... 364/409
4,774,665 9/1988 Webb .................... 364/409
5,117,358 5/1992 Winkler .................... 364/419
5,218,528 6/1993 Wise et al. .................... 364/409
5,278,753 1/1994 Graft, III .................... 364/409

*Primary Examiner*—Roy N. Envall, Jr.
*Assistant Examiner*—Khai Tran
*Attorney, Agent, or Firm*—Townsend and Townsend Khourie and Crew

[57] ABSTRACT

A voting system allows voters to express and cast votes that are conditional on the votes of others of a voting group. Votes may be conditional on the votes of specific individuals, on the number or percent of the overall group who vote a certain way, external events or on any combination thereof. The system solves the "common goods, free rider" dilemma in which voters oppose proposals they recognize as worthwhile out of fear that a few supporters will be burdened with all of the costs. The system specifies and enforces terms under which conditional voting will take place, and may manage the voting process across a network. The system recognizes when either multiple solutions or no solutions to a set of votes exist. The system can determine which voters are responsible for these cases, and can invite them to change their votes, if they wish. The system can also determine the largest subset or subsets of a group of conditional votes that has no solution, for which there is a unique solution or multiple solutions. Overall, the system leads to better and faster group decisions that are based on more complete voter knowledge than simply yes, no or abstain.

39 Claims, 13 Drawing Sheets

| **1) UNCONDITIONAL** | **CONDITIONAL** | |
|---|---|---|
| **No Dependencies**<br>• Yes<br>• No<br>• Abstain<br>• No Vote | **2) *Group* Dependencies Only**<br>(Voters are indistinguishable from one another) | **3) *Individual Voter* Dependencies**<br>(Votes may depend upon votes of specific individuals) |

Fig. 4

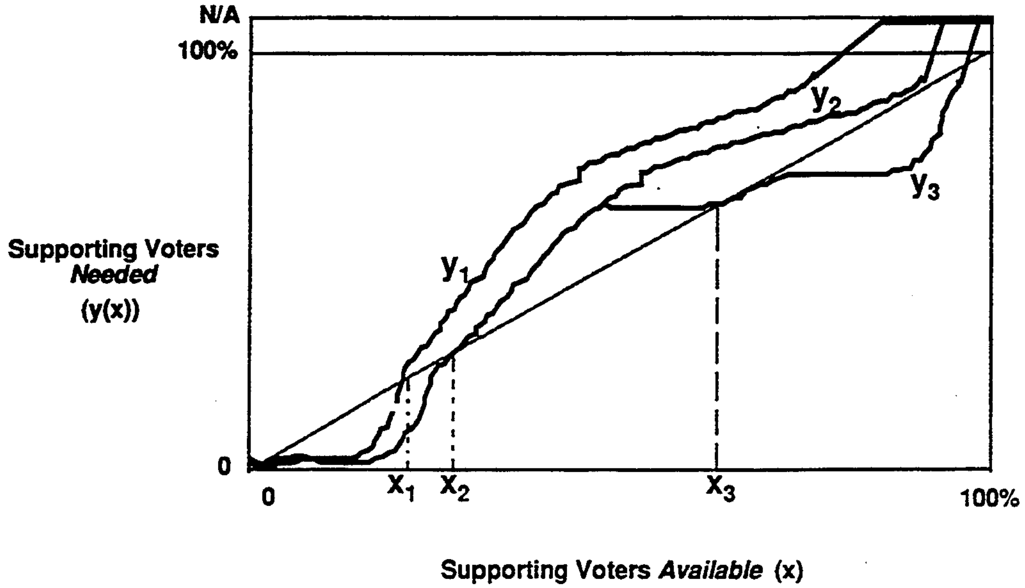

Fig. 5

| Person: | Amy | Bill | Charlie | Dave | Ed | Frank |
|---|---|---|---|---|---|---|
| y = number of supporters in group required for this person to support proposal: | 5 | 1 | 1 | 2 | 6 | Not Applicable (NA) |

Fig. 6

| Person: | Bill | Charlie | Dave | Amy | Ed | Frank |
|---|---|---|---|---|---|---|
| x: | 1 | 2 | 3 | 4 | 5 | 6 |
| y = number of supporters in group required for this person to support proposal: | 1 | 1 | 2 | 5 | 6 | Not Applicable (NA) |

Continued from Fig. 10D

| (New) Voter Number: | 1 | 2 | 3 | 4 | 5 |
|---|---|---|---|---|---|
| y = number of supporters in group required for this person to support proposal: | 1 | 2 | ? | 2 | 4 |

Fig. 11

| (New) Voter Number: | 1 | 2 | 4 | 5 | 3 |
|---|---|---|---|---|---|
| x: | 1 | 2 | 3 | 4 | 5 |
| y = number of supporters in group required for this person to support proposal: | 1 | 2 | 2 | 4 | ? |

Fig. 13

| Step: / Vote: | Stage 1 | Stage 2 Part 1 | Stage 2 Part 2 | Stage 2 Part 1 (Pass 2) | Stage 2 Part 2 (Pass 2) | Stage 3 |
|---|---|---|---|---|---|---|
| #1 - Yes | Y | Y | Y | Y | Y | Y |
| #2 - Yes if and only if #1 votes yes | Y | Y | Y | Y | Y | Y |
| #3 - Yes if and only if ≥3 vote yes | | Y | Y | Y | Y | Y |
| #4 - Yes if and only if #3 votes yes | | | Y | Y | Y | Y |
| #5 - Yes if and only if ≥5 vote yes | | | | Y | Y | Y |
| #6 - Yes if and only if #5 votes yes | | | | | Y | Y |
| #7 - Yes if and only if 8 vote yes | | | | | | N |
| #8 - No if #7 votes yes: else yes | | | | | | Y |

Fig. 12

| Group trial assumption: / Vote: | 1 | 2 | 3 | 4 |
|---|---|---|---|---|
| #7 - Yes if and only if 8 vote yes, else no | Y | Y | N | N |
| Test: | ✔ | X | ✔ | ✔ |
| #8 - No if #7 votes yes: else yes | Y | N | Y | N |
| Test: | X | ✔ | ✔ | X |

Fig. 14

Best Trial

| Voter | 1 | 2 | 3 | 4 |
|---|---|---|---|---|
| #1 | Y | - | - | N |
| #2 | - | N | Y | - |
| #3 | Y | Y | N | N |
| #4 | Y | Y | N | N |
| #5 | Y | Y | N | N |

Fig. 15

Best Partial Solution

| Voter | 1 | 2 | 3 | 4 |
|---|---|---|---|---|
| #1 | - | - | - | - |
| #2 | - | - | - | - |
| #3 | - | - | - | - |
| #4 | - | - | - | - |
| #5 | - | - | - | - |

Fig. 16

Best Trial

| Voter | 1 | 2 | 3 | 4 | 5 | 6 | 7 | 8 |
|---|---|---|---|---|---|---|---|---|
| #1 | Y | Y | - | - | - | - | N | N |
| #2 | - | - | N | N | Y | Y | - | - |
| #3 | Y | N | Y | N | Y | N | Y | N |
| #4 | Y | N | Y | N | Y | N | Y | N |

Fig. 17

COMPUTER NETWORK BASED CONDITIONAL VOTING SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer based voting applications, and more specifically, to a computer network based conditional voting system.

Systems for voting have existed since human beings started counting raised hands. This ancient approach did not allow for secrecy, and required that everyone in a group voting had to be at the same place at the same time. Later, the secret ballot and ballot box provided secrecy and freedom from voting at a fixed time, but still required that voters congregate at a specific place. Computer networks that reach individuals wherever they may be, through desktop, portable and hand-held input/output devices (e.g. keyboards and displays), later allowed votes to be cast by voters anywhere, without the need to congregate in one place.

All of these systems, including the modern, computer based ones, make use of very simple ballots. These ballots offer voters a limited choice, typically of one or more of the following: 1) vote Yes or No, and sometimes Indifferent and/or Abstain; 2) select one or more of multiple choices from a list; 3) write-in a desired selection; or 4) prioritize a list of alternatives.

These conventional alternatives can limit the ability of a group to make the best decision, or limit the voters from expressing their true preferences. Specifically, the conventional systems do not allow users' votes to be conditional on the votes of other members of the group. The following examples illustrate a few of the shortcomings of conventional voting systems.

Example 1. Person A may not be well informed on the issue, but knows that person B is, and has a high degree of confidence in person B's judgment. Person A may therefore wish to vote "the same as B votes", whether or not A knows what B's vote is. In traditional voting systems, the only way A can vote with B is to consult with B before the vote takes place to find out how B is voting. But if B should change his vote at the last moment, or if A has no way of contacting B, or if B has not yet decided his vote when A and B are able to discuss the matter, then A cannot guarantee that his vote is the same as B's. As a further example, A may wish to vote the way the "majority of B, C and D vote". In this example, the communication and logistical problems are three times as complicated as A merely voting with B.

Example 2. Person A's primary goal may be to support the position of a person B (perhaps the employer or spouse of person A). A may therefore choose to vote whichever way B votes on a wide variety of matters. To achieve this end with conventional voting systems, A would need to consult with B on every single matter, a time-consuming and perhaps impossible requirement.

Example 3. Persons A and B have agreed to trade votes on different issues. On issues 1, 3, 5, and 7, A will vote the same way as B. On issues 2, 4, 6, and 8, B will vote the same way as A. Again, to achieve this end with conventional voting systems, extensive and time-consuming coordination between A and B would be required.

Example 4. Person A's primary goal is to support the majority's view. Person A may therefore choose to vote whichever way the majority votes. To achieve this end with conventional voting systems, A must either guess or conduct a poll of other voters before the vote, either of which could be inaccurate or could change, to assess the majority's vote before the voting takes place.

Example 5. Person A does not particularly support an issue, but would vote in favor of it if all of persons B, G, M, P, S, W, and Z voted in favor of it. To achieve this end with conventional voting systems, would require contacting all of those individuals before the voting took place. (This example is similar to the majority of B, C and D in example 1 above.)

Example 6. The cost per person of a proposed shared asset, such as a new road or public library, is inversely proportional to the number of persons who help fund the proposed asset. Person A likes the proposal, whose overall cost is $10,000, but is only willing or able to pay up to $200 for it. There are 100 people in the group; those who support the proposal will share its cost equally. Person A would therefore vote in favor of the proposal if and only if at least 50% of the group (any 50 out of 100 people) ended up supporting the proposal ($10,000/50=$200). Each of the other 99 members of the group similarly have their own budget limitations, for example, person B is willing to pay no more than $150, and person C, no more than $125. To identify who is in the supporting group, and whether a solution is even possible, is a complex process with conventional voting systems.

Example 6 above is a case of what is more generally called the "common goods" problem. Conventional voting systems are particularly inadequate for these problems. "Common goods", such as public parks, libraries, a clean environment, labor unions, lighthouses, fire departments, or a counter-attack on a belligerent aggressor nation, are beneficial to all, but all have some cost. "Common goods" can be abused by "free riders". A "free rider" is someone or something that enjoys the benefit of the common good without helping to pay for it.

With conventional voting systems, it is often difficult to get people to pay for common goods. There is an incentive for people to wait until others pay for the goods, and then enjoy it as free riders. Consequently, beneficial measures are often postponed or not taken while people or countries wait for others to act. People need the ability to say: "I support this measure if and only if 'X' percentage or more of the group will support it," or "I support this measure if all of persons A, B, C, D and E support it". Different members of the group will have different preferences. One person may require 80% of the group's support to support the measure; someone else may require only 50%; someone else, 90%.

SUMMARY OF THE INVENTION

According to the invention, a method and apparatus is provided for a computer network based conditional voting system. The system is used by two or more persons to arrive at a decision and allows the users to vote either unconditionally (i.e., yes, no, or abstain) or conditionally on the votes of others within the voting group. Conditional votes can be dependent upon the votes of specific individuals, a specific group of individuals, a non-specific subset of the group, the group as a whole, upon independent events, or any combination of the above. Votes need not be weighted equally.

The preferred embodiment uses a vote processor, a voting administrator, and one or more voting units. The vote processor is a computer which coordinates the overall voting process including soliciting and accepting input from the voting units and then tabulating and displaying the results. The vote administrator inputs or approves the vote proposal and terms of the vote into the vote processor. The voting units, connected to the network by any means, are of various design including desktop mountable, handheld, and mobile. In the preferred embodiment the voting units' sole task is providing input/output (I/O) for voting while in an alternative embodiment, the voting units are general purpose devices with multiple functions, only one of which is voting.

In use, one or more parties submit and/or modify a proposal requiring a vote. After the terms and conditions of the vote are stated by the vote administrator, input from each voter is solicited and accepted through the individual voting units. The voting may be either unconditional or conditional. The terms and conditions expressed by the vote administrator determine what form the conditional input can take.

In the preferred embodiment, all input must be submitted by a first deadline. The vote processor then evaluates the conditional votes according to the terms of the vote, and tabulates the results. The results are displayed to the group of voters at which time a second vote is allowed. The vote processor cycles through the process of soliciting, accepting, evaluating, processing, and displaying the results until a final deadline is reached.

Reference to the remaining portions of the specification and the drawings realize a further understanding of the nature and advantages of the invention.

BRIEF DESCRIPTION OF THE DRAWINGS

FIG. 4 is a table illustrating three major types of votes;

FIG. 5 is a consensus building chart showing the evolution of a proposal over time;

FIG. 6 is a table showing the number of proposal supporters required per voter;

FIG. 11 illustrates a table showing the votes before re-ordering;

FIG. 12 illustrates the table of FIG. 11 after re-ordering;

FIG. 13 illustrates a Stage 3 example in which the vote determination is done by stage;

FIG. 14 illustrates a Stage 3 example of testing group trials;

FIG. 15 illustrates a Stage 3 example of best group trials;

FIG. 16 illustrates a Stage 3 example showing no complete or partial solutions; and FIG. 17 illustrates a Stage 3 example where only partial solutions are possible.

DETAILED DESCRIPTION OF SPECIFIC EMBODIMENTS

Figure 1:
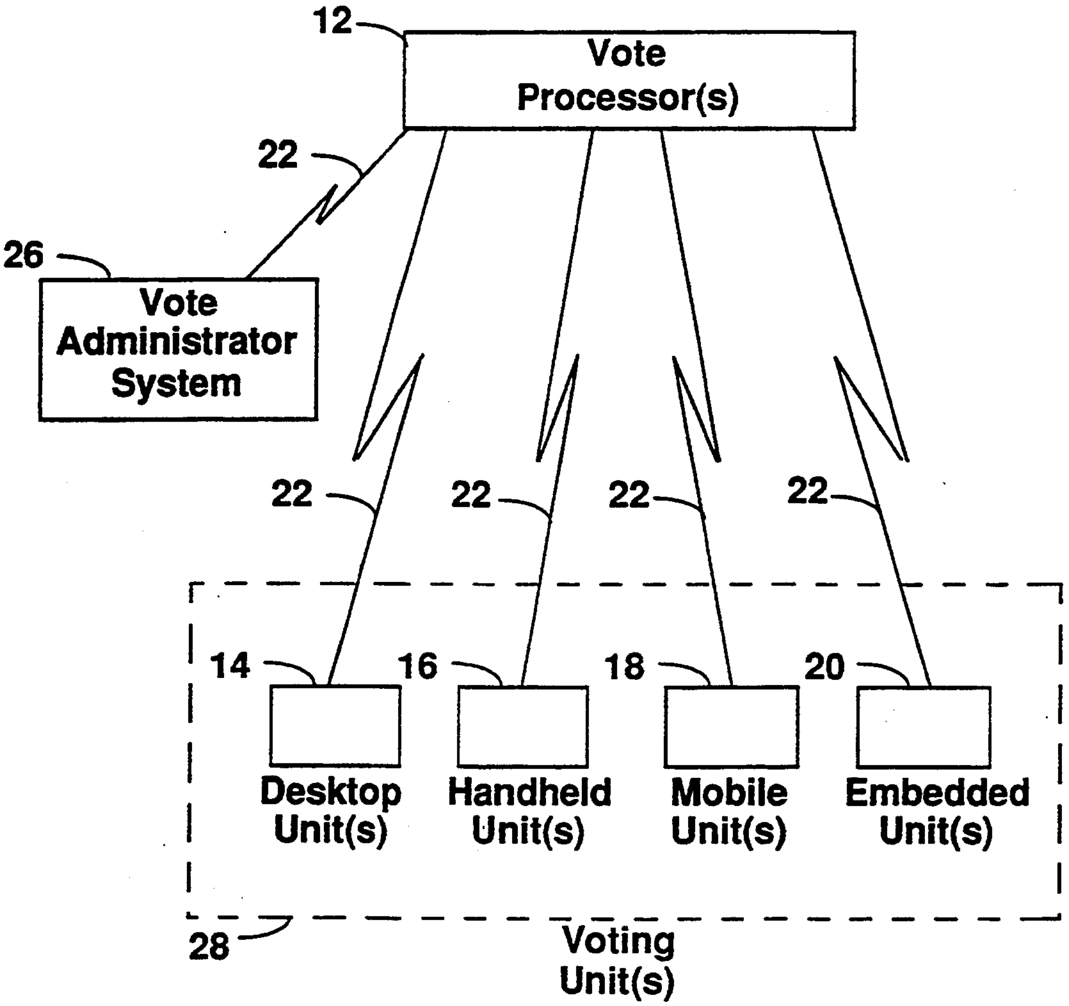
FIG. 1 illustrates the hierarchical configuration of the present invention.
Figure 2:
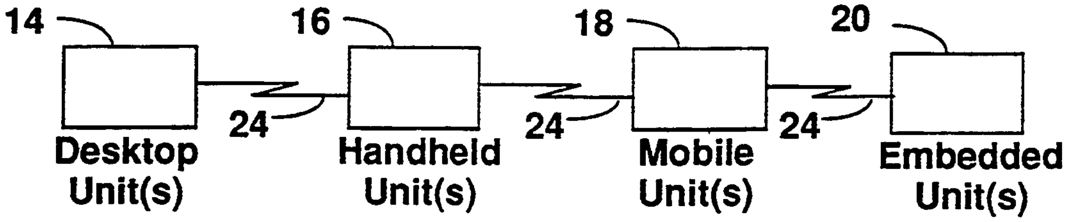
FIG. 2 illustrates the peer-peer configuration of the present invention.

FIGS. 1 and 2 show two different configurations of the conditional voting system disclosed in the present invention. FIG. 1 shows a "star" configuration; FIG. 2 shows a "peer-peer" configuration. Any combination of these configurations is also possible. In FIG. 1, the voting units 14, 16, 18, and 20 and a vote administrator system 26 are networked to one or more vote processors 12. The vote processor(s) are one or more computers on which processing of votes take place. The vote processor(s) coordinate the voting process, solicit and accept input from the voting units, tabulate results, and feed back information to the voting units. If the network does not employ such a computer, as in FIG. 2, one or more of the voting units can handle these functions.

The preferred embodiment of the computer program for performing the vote processor functions is given in the Appendix incorporated herein. Details of the specific functions of this program are described in the following specification.

The voting unit may be a desktop unit 14, a portable, handheld unit 16, a mobile unit 18 for moving vehicle, water, air or space craft, or it may be embedded in a computer 20. Any number of voting units of any type are allowed. Each voting unit may either be a dedicated device, with the sole task of providing I/O for voting, or it may be a general purpose device (such as a personal computer or intelligent TV set) with multiple functions, one of which is voting. Each voting unit includes a keyboard, keypad or similar data entry device for vote input, and an information display for output.

Each voting unit is typically used by an independent decision-maker. This decision-maker may either be a person, a group of people voting as one, a computer program, or a group of computer programs acting as a single decision-making entity. It is also possible for multiple persons or programs to share the same voting unit and act as independent decision-makers. In this case, the voting system must be able to accept and recognize the input of multiple voters from that voting unit.

If a voting unit is to be used by one or more persons, the unit requires a keyboard, keypad, or other data entry device for vote input, and an information display for output. If a voting unit is to be used by one or more computer programs, the unit requires a programming interface from which the unit can accept input and to which it can write output.

The vote administrator may be either a person or a program. If it is a person, vote administrator system 26 must include a keyboard or other data entry device and a display, to allow the vote administrator to input the vote proposal and terms of the vote to the system. If the vote administrator is a program, a programming interface is required between the program and the voting system for the same purpose. If the network does not employ a separate vote administrator system, as in FIG. 2, one of the voting units may perform this function.

The network 22 (FIG. 1) or the network 24 (FIG. 2) may be based on any form of local or wide area network, including cable, leased lines, switched lines, wireless, or any combination thereof. The network may be shared by other devices and applications, or dedicated to the voting system.

Figure 3:
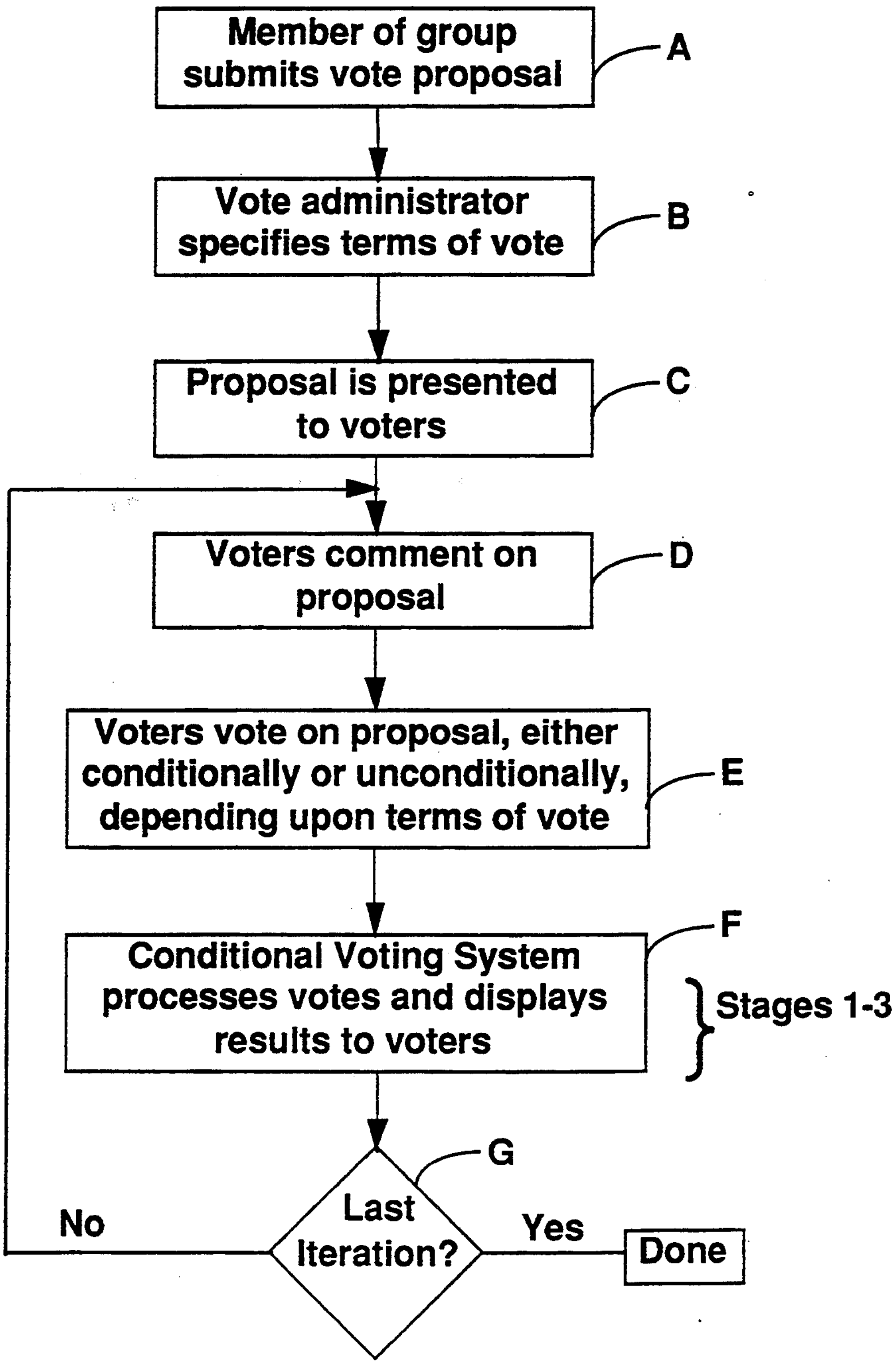
FIG. 3 is a high level flowchart illustrating the operation of the computer network based conditional voting system.

FIG. 3 is a flowchart of the preferred embodiment of the invention. In this case voting begins when an individual, the proposal originator, develops one or more vote proposals. A vote proposal may take many forms. It may be able to be voted on affirmatively or negatively, or it may contain multiple alternatives that can be prioritized, that is, ranked, by voters. A vote administrator is a person or program charged with specifying terms and conditions of a voting. The vote administrator may be the same as, or different from, the proposal originator. Either the proposal originator or the vote administrator must enter the proposal into the system in electronic form (step A). In the preferred embodiment the proposal is entered by keyboard. If the proposal is entered by the originator, the system makes it available electronically to the vote administrator, for example on a computer screen. Either before or after proposals are submitted, the vote administrator specifies the terms and conditions for the votes (step B), such as who may vote, voting deadline(s), and constraints, if any, on allowed vote types. The voting system then notifies members of the group through the voting units or through other means that there are one or more proposals to be voted on (step C).

Either at a convenient time or (if so dictated by the terms and conditions of the voting) a specified time, each voter reviews the proposals along with any related remarks or justifications provided by the originator. The voters themselves can then comment on each proposal (step D), and send these comments through the network to all of the voters or any subset of the voters. Finally, the voters vote on the proposal (step E), either unconditionally (yes, no, abstain), or conditionally, depending upon what vote types were allowed by the vote administrator (see different types below). If a voter does not vote by a deadline, the voting system registers the voter as a no vote.

All votes do not have to be weighted the same. If specified by the vote administrator, some votes may be weighted differently from each other. The default weighting of a vote is 1.0. If the vote administrator weights voter x's vote by the factor W(x), $0 \leqq W(x)$, then voter x's vote will be treated as W(x) separate votes in final tabulations of all of the votes.

The system then processes the votes to compute their values (represented as signals). Depending upon the types of votes allowed by the vote terms (specified by the vote administrator) and upon the specific votes cast by the voters, the processing performed will vary. As shall be seen below, a processed vote may have either a unique computed value, multiple values, or no meaningful value (i.e., no solution). An unconditional vote always has a unique value—either yes, no or abstain—but a conditional vote may have either a unique value, multiple values, or no meaningful value. The vote terms determine, among other things, how multiple values and no meaningful values of votes are handled. For example, if the computed value of a vote is either yes or no, the terms may specify that "yes" will always be selected and presented as output. This approach can help build consensus among the voters. Or, the terms may specify that both values must be presented as output. If a vote has no meaningful computed value, the terms may specify that this fact be presented as output, or they may specify that the voter who casts that vote change his or her vote. Votes that have multiple computed values are called herein indeterminate. Votes that have no meaningful values or solutions are called herein unresolvable.

The output or results provided by the system (Step F) may take any of several forms. If all of the votes have unique computed values, the results may simply be a total of the number of yeses, nos, abstains, and no votes. If some of the votes have multiple computed values, the terms will specify which value or values of these votes will be selected. These values are then included in a tally or tallies of the values of the votes with unique values. For example, suppose that the computed value of vote #1 is uniquely yes, the computed value of vote #2 is uniquely yes, and the computed values of votes #3 and #4 are either (yes and yes), or (no and no). If the terms specify that the value "yes" is always chosen for a vote with multiple computed values (assuming that one of the computed values is yes), then the tally in this case would be 4 yeses and no nos. If, on the other hand, the terms specify that all computed values of a vote must be presented, then two separate tallies—4 yeses and no nos, and 2 yeses and 2 nos—would be reported. The terms may further specify that the set or list of all computed values by voter be reported. With the first set of terms above, there would be a single set or list. With the second set of terms above, there would be two such sets or lists. If some of the votes have no meaningful solutions, they would be omitted from the tallies of yeses, nos, and abstains.

The output or results may take other forms as well. Results may include a listing of the conditional votes themselves, or as described below, static or animated graphics that show the degree of consensus in the group, either at a point in time or as it changes over time. These results may further help the group move toward consensus. Step F is divided into three (3) stages, which are illustrated in FIGS. 9A–B and 10A–E.

Many votings are iterative (step G), that is, voters cast their votes, see the results, perhaps modify their votes and comments, and vote again. The voting system again tabulates and presents the results. This process is repeated until a particular result or deadline is reached.

The present invention is capable of processing any form of vote which is conditioned on the vote of one or more members of the group. FIG. 4 is a table illustrating three categories of votes. Type 1 votes are unconditional votes with no dependencies: yes, no, abstain, no vote. Types 2 and 3 are conditional.

Type 2 votes have group dependencies (conditions) only; they are dependent only on the voting of the group as a whole (e.g., "I vote yes if and only if 50% or more of the group votes yes"), not of the votes of specific individuals. As far as group dependencies are concerned, individual voters are indistinguishable from one another. Type 2 votes are especially important for moving the group towards consensus.

For convenience, each voter can express a group condition in terms of the total number of voters, including himself/herself, or in terms of the rest of the voters, excluding himself/herself. A group condition can be also expressed either in terms of percentages (e.g., 50% of the group) or in units (e.g., 10 or more votes).

Type 3 votes are dependent on the votes of specific individuals in the group (e.g., "I vote yes if and only if A, B and C vote yes"). Type 3 votes may also have group dependencies (e.g., "I vote yes if and only if A votes yes, and if 50% or more of the group votes yes"). Type 3 votes, in effect, may be conditional on any logical statements L and L' about the voters. In the simple case of yes, no and abstain votes, the general form of a type 3 vote is: "Yes, if L is true; else no, if L' is true; else abstain." In the more complex case of prioritized or ranked lists of alternatives, the general form of a type 3 vote is: "Rank order #1, if L is true; rank order #2, if L'' is true; rank order #3, if L''' is true; rank order #4, if L'''' is true, etc."

Other examples of type 3 votes are: (i) voting the same as another person's vote; (ii) voting the opposite of another person's vote; (iii) voting the way the majority of parties x, y, and z vote; and (iv) voting yes if at least 50% of the group, including x, y, and z vote yes.

The conditions of a vote may themselves be conditional or unconditional, as in the following two examples:

i) Voter #1 votes yes if and only if: voter #2 votes yes unconditionally (an unconditional condition).

ii) Voter #1 votes yes if and only if: voter #2 votes yes, conditionally or unconditionally (a conditional condition).

Assuming that voter #2 votes yes if and only if voter #3 votes yes, conditionally or unconditionally, and voter #3 votes yes unconditionally, then in the first case above voter #1 would vote no. This is because in the first case #1's vote was conditioned on 2 vote being unconditional, which it wasn't. In the second case voter #1's vote would be yes since its condition allows for voter #2's yes vote to be either conditional (which it is) or unconditional.

In the preferred embodiment, if a condition is not specific as to whether it is conditional or unconditional, it is assumed to be conditional. For example, in "Voter A votes yes if B votes yes", it is assumed that what is important to A is that the final determined value of B's vote is yes, rather than how B arrived at it. If it is important to A that B vote yes unconditionally, this should be specified in A's condition.

Conditional conditions also apply to votes with only group dependencies. For example:

i) Voter #1 votes yes if and only if 60% or more vote: yes unconditionally (an unconditional condition).

ii) Voter #1 votes yes if and only if 60% or more vote yes (conditionally or unconditionally).

Assuming that voter #1 is one of three voters, and voters #2 and #3 vote as before, in the first case voter #1's vote would be no, since only #3 voted yes unconditionally. One vote out of three is less than the required 60%. In the second case, voter #1's vote would be yes. Not only do voters #2's and #3's votes meet #1's condition, but #1's own yes vote helps meet #1's condition. #1's vote is called recursive with a group dependency only.

In this case, recursion did not affect vote #1. But in other cases, it may. For example:

Voter #1 votes yes if two or more vote yes,

Voter #2 votes yes if two or more vote yes.

Voter #3 votes no (unconditionally).

In this case, vote #1 relies on both vote #2 and itself to meet its condition; vote #2, in turn, relies on both vote #1 and itself. Note that in this case #1's and #2's votes could be either both yes or both no. These cases are resolvable but are indeterminate, that is, they have multiple solutions (determined in stage 3 of the voting system). In general, allowing voters to vote the same way as each other can lead to multiple solutions. In the simplest case, if A votes the same way as B, and B votes the same way as A, the two votes could be either Yes-Yes or No-No.

The terms set by the vote administrator determine whether the system presents or reports all or a subset of the multiple solutions, when they arise. In the interest of consensus, the default assumption where a group of votes has multiple solutions is usually the one with the most yeses.

The vote administrator may specify any of the following output alternatives: i) present all solutions; ii) present all solutions that meet certain criteria, such as all solutions with three or more yeses; or iii) present only those solutions with either the most yeses or the most nos; or iv) present an "average" of all solutions. In addition to any of these four alternatives, the system can recommend to voters whose votes cause the multiple solutions how their votes can be modified to eliminate multiple solutions.

A different problem is encountered in the following scenario:

Voter #1 votes yes if #2 votes yes; else, no.

Voter #2 votes no if #1 votes yes; else, yes.

Restating this example more simply, A votes the same as B, and B votes the opposite of A. There is no solution. Allowing voters to vote opposite the way of others can lead to this result. These votes are called unresolvable.

In these cases, the system reports whose votes contain no solution, either to only the individuals casting those votes or to the group as a whole, depending upon the terms of the vote. One or both of the voters need to change their votes to make a solution possible. A partial solution is a subset of all of the votes that have a solution. When there are unresolvable votes, the voting system identifies the partial solutions with the most votes, and identifies the unresolvable votes.

Combinations of the above solution types are quite possible. A group of votes may contain some votes with multiple values and others that are unresolvable. The voting system can handle any set of conditions on the group as a whole or on individual members of the group, no matter how complex or intertwined.

The system can determine which vote or votes are most or least critical in obtaining a particular result. One way to do this is by tabulating the number of times particular votes are referenced as conditions in others' votes. In addition, the number of times a vote is used in conditions negatively may be subtracted from the number of times the vote is used in conditions positively to arrive at the vote's net positive impact on a particular result.

Certain votes with only group dependencies (no individual voter dependencies) can help build consensus and overcome the common goods/free rider problem. Called consensus building votes, they allow a voter to vote in favor of a proposal, such as a common goods proposal, if and only if a specified percentage of the entire group supports it. For example: "I will support the building of a public park in our neighborhood (and contribute my share of the cost) if and only if 80% of the voters similarly support it." If at least 80% of the group vote similarly, the park will be approved. Those voters will have the assurance that at least 80% of the group will contribute their share.

The general form of the consensus building vote type is; "I vote yes if greater than or equal to x% of the group vote yes; else, I vote no." Another form of the consensus building vote type, most appropriate if all members of the group are casting votes that are either of this type or unconditional is; "I vote yes if greater than or equal to x% of the group vote yes, if greater than or equal to y% vote yes; else I vote no," where $0 \leqq x \leqq 100$ and $0 \leqq y \leqq x$.

In contrast, a form of vote which is not as effective in moving the group towards consensus is; "Yes, if $\geqq x\%$ vote yes unconditionally; else, no."

The consensus building vote type allows a voter to commit to what may be a risky position only if a certain number or percent of the rest of the group similarly commit, reducing the risk to all of the voters.

If all votes are either unconditional or of the consensus building type, the voting system can provide a novel graphical display of the degree of agreement or disagreement among the voters. The consensus building chart helps the group move towards and reach consensus. It may also be possible to produce the chart if some of the votes are neither unconditional nor consensus building. Even if the chart is not requested as output, the system typically performs the sorting and comparisons needed to draw the chart to value consensus building votes. If more than one solution is possible, the chart identifies the solution with the largest number of yeses.

The consensus building chart allows a group to see how close or far away it is from achieving consensus, or from achieving a coalition of a particular size. If a voting has successive iterations, the graph may vary with each iteration. In that case, the graph can be updated or played back in real time, allowing voters to review an animated history of the group's preferences as they have evolved, to visually gauge the momentum towards consensus, or to pinpoint turning points or major events in the group's dynamics. FIG. 5 illustrates a consensus building chart with three successive iterations; $y_1$, $y_2$, and $y_3$. The figure shows how the acceptance of the proposal has changed with each successive vote, indicating that at least some of the individual voters have modified their votes. Similarly, if $y_1$, $y_2$, and $y_3$ were to indicate three different proposals, then a chart looking like FIG. 5 could be used to gauge the relative acceptance of each distinct proposal.

The chart orders the voters available (x axis) to support a proposal by the total number or percent of voters they require (y axis), including themselves, to support the proposal. Where the number of voters available equals or exceeds the number of voters required, those voters' votes can be correctly determined to be yes votes. These voters are said either to support the proposal or to form a coalition favoring the proposal.

For example, a group of six voters votes as follows:

Amy (cautiously) supports a proposal if and only if five (5) or more people in the group, including herself, support it (maximum of one dissenter).

Bill, a strong advocate, supports the proposal in any event (no one other than himself is required for his support).

Charlie also supports the proposal in any event.

Dave votes in favor if at least one other person supports it.

Ed votes in favor only if the group is unanimously in favor of it (6 supporters).

Frank opposes the proposal under all circumstances.

Figures 7, 8:
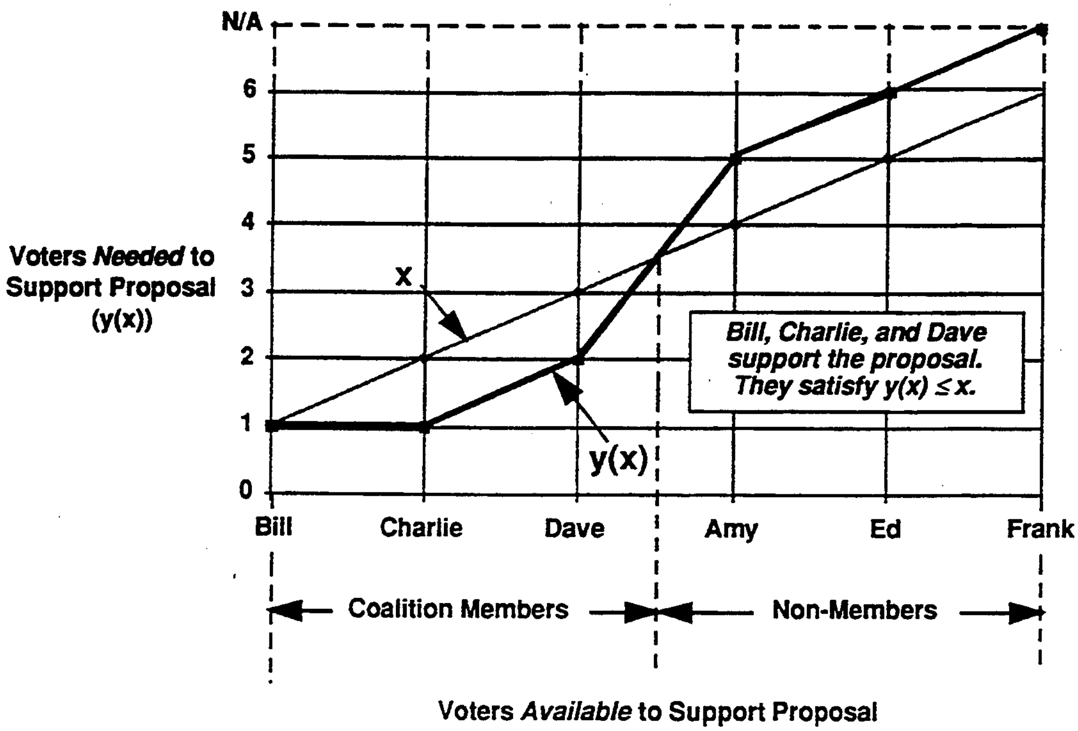
FIG. 7 is a re-ordering of the information from the table of FIG. 6, ordering the voters by the number of proposal supporters required to support the proposal.
FIG. 8 illustrates a consensus-building chart.

FIG. 6 is a table illustrating the above information. Ordering the voters by their conditions as described above, Bill and Charlie would be ordered #1 and #2; Dave, #3; Amy, #4; Ed, #5 and Frank, #6 (FIG. 7). If Charlie subsequently raised his requirement from one person to three, he would shift from #2 to #3, and Dave would shift from #3 to #2. In FIG. 7 this ordering is called "x".

The system then plots the number of members needed (y) to form a coalition as a function of the ordered members (x). If the number of members required (y) is less than or equal to the number of members available (x), a coalition can form. The members of the coalition are those members of the group for whom $y(x) \leqq x$ (FIG. 8).

In general, wherever y(x) dips below the $y = x$ line, a coalition can form. If $y(x) > x$ for all values of x, no ones' conditions are met, and no coalition can form. In general, the supporting coalition will include all voters $x_c$ whose values of x are smaller than $x_{max}$, where $x_{max}$ is the largest value of x for which $y(x_{max}) \leqq x_{max}$. The supporting coalition may well include values of $x_c$ for which $y(x_c) > x_c$. But as long as $x_c < x_{max}$, and $y(x_{max}) \leqq x_{max}$, $x_c$'s vote can be correctly interpreted as a yes (there may be other solutions as well). In the example above, Bill, Charlie and Dave are in the coalition, because $x_{Bill}$ and $x_{Charlie} < (x_{Dave} = x_{max})$, and because $y(x_{Dave}) < x_{Dave}$.

Figure 9A:
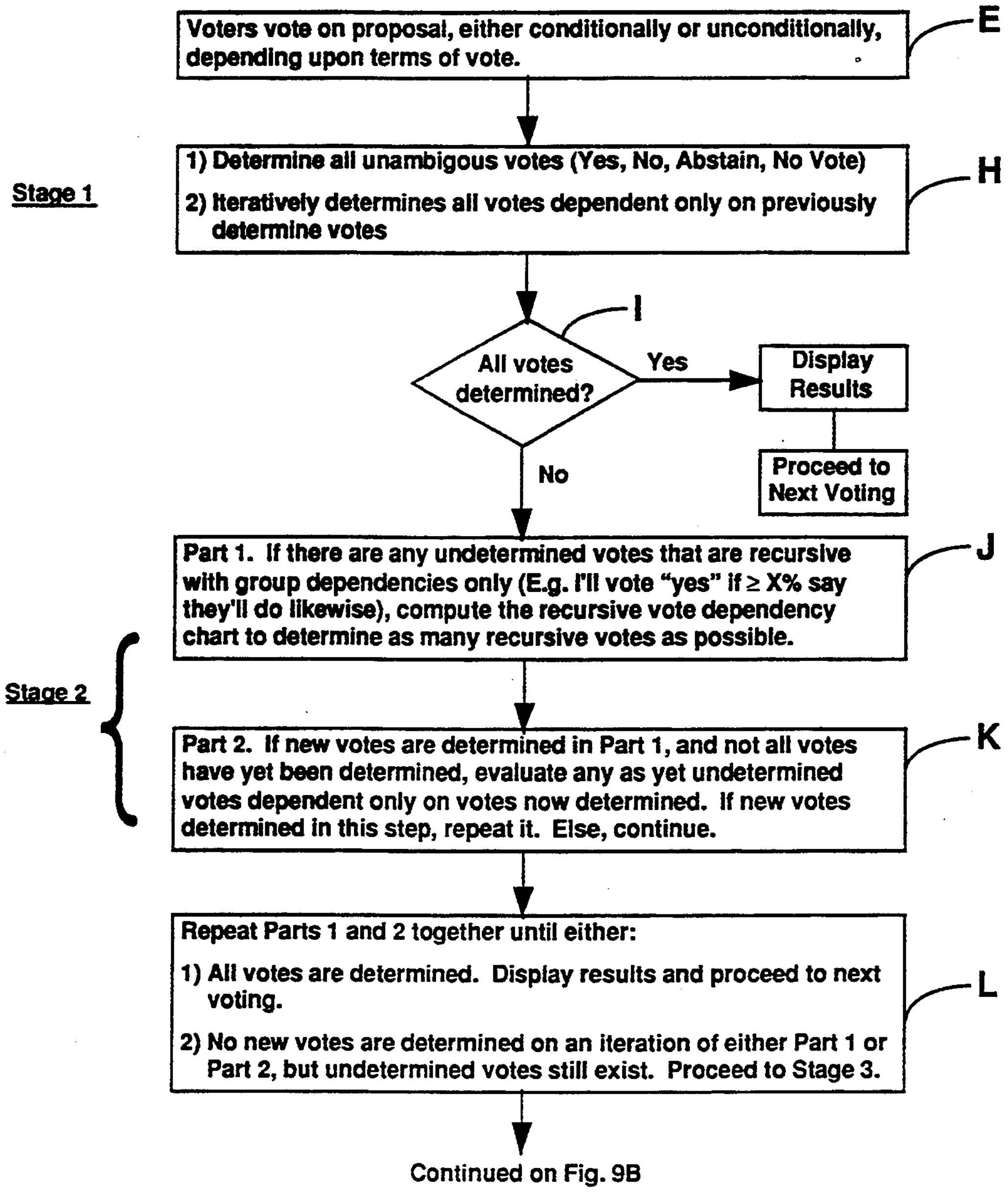
FIGS. 9A–B are intermediate level flowcharts showing the three stages of vote processing.
Figure 9B:
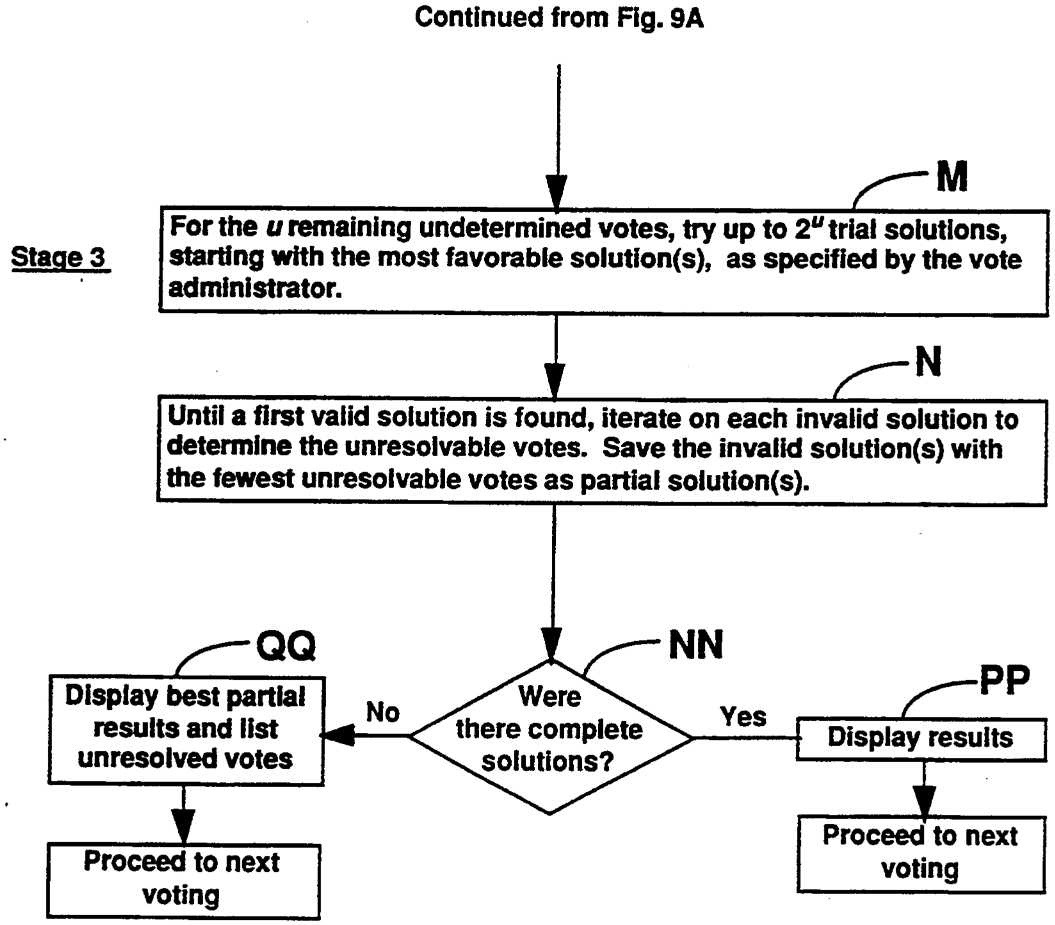
Figure 10A:
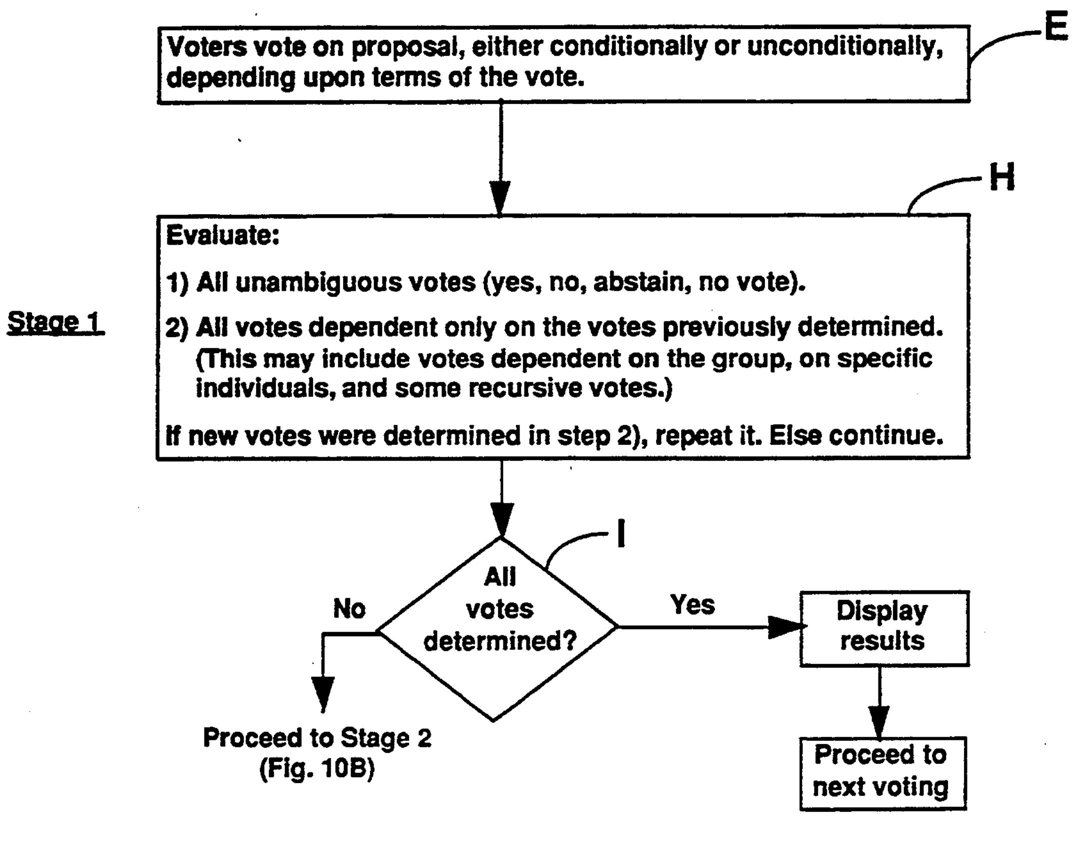
FIGS. 10A–E are detailed flowcharts showing the three stages of vote processing.
Figure 10B:
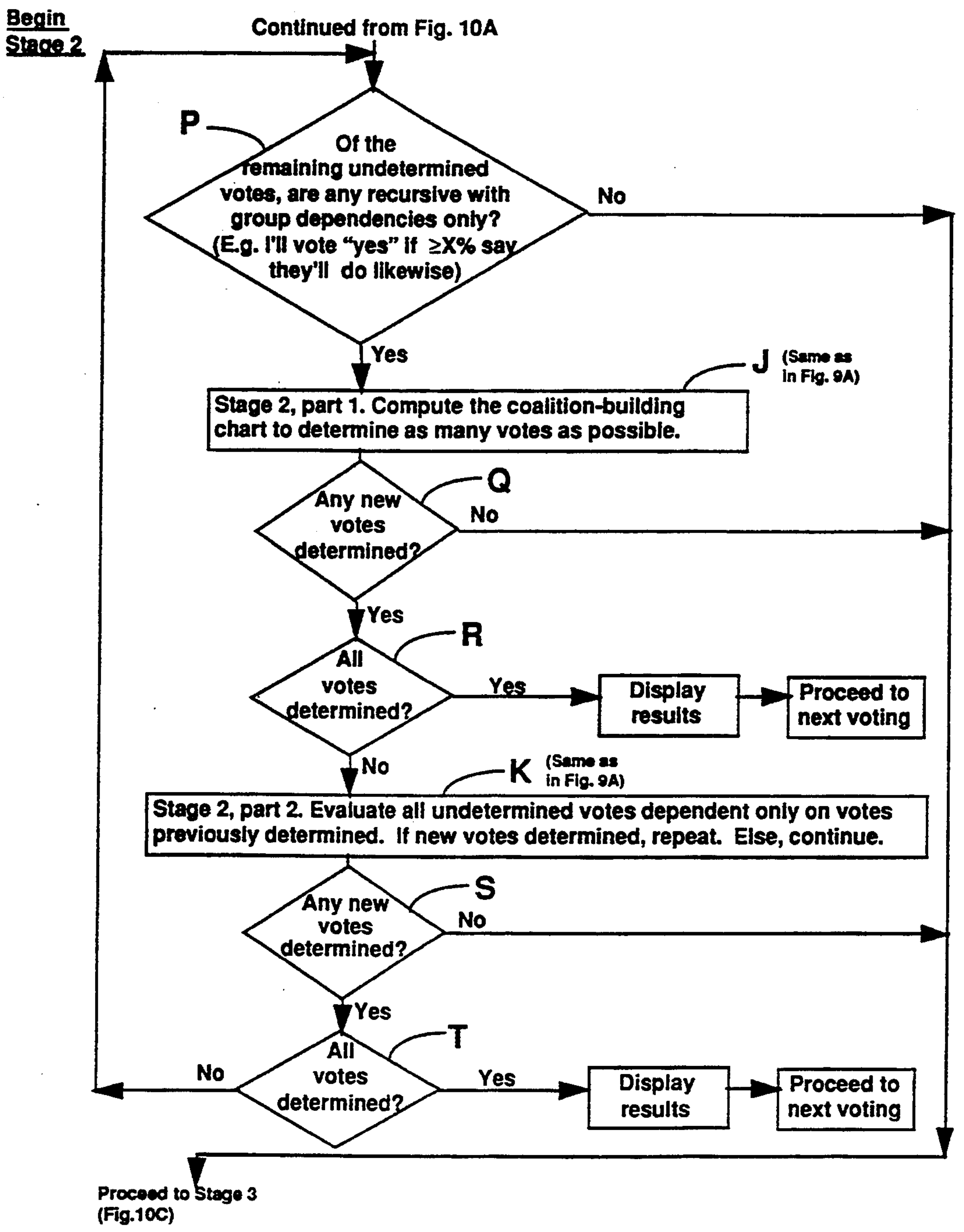
Figure 10C:
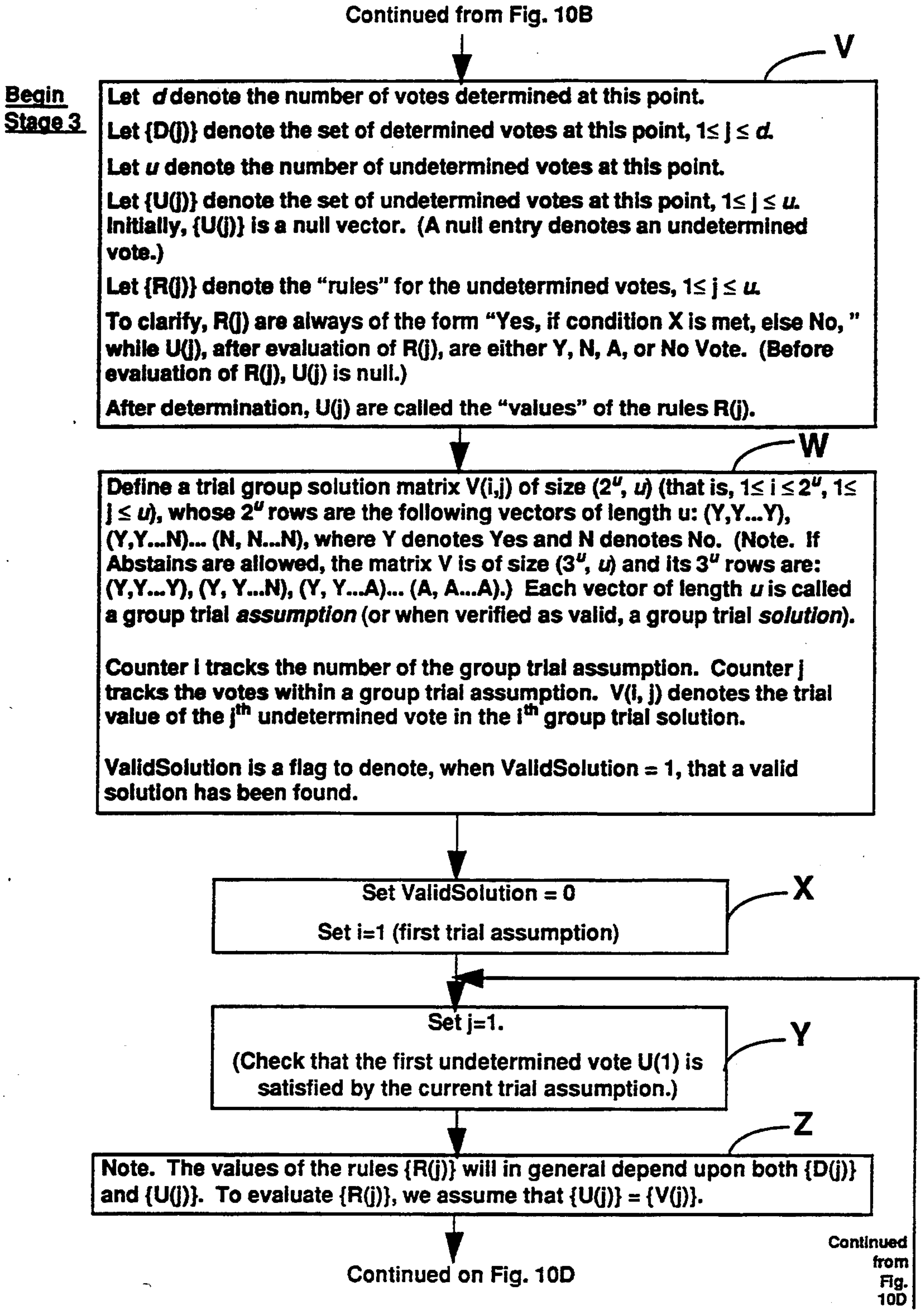
Figure 10D:
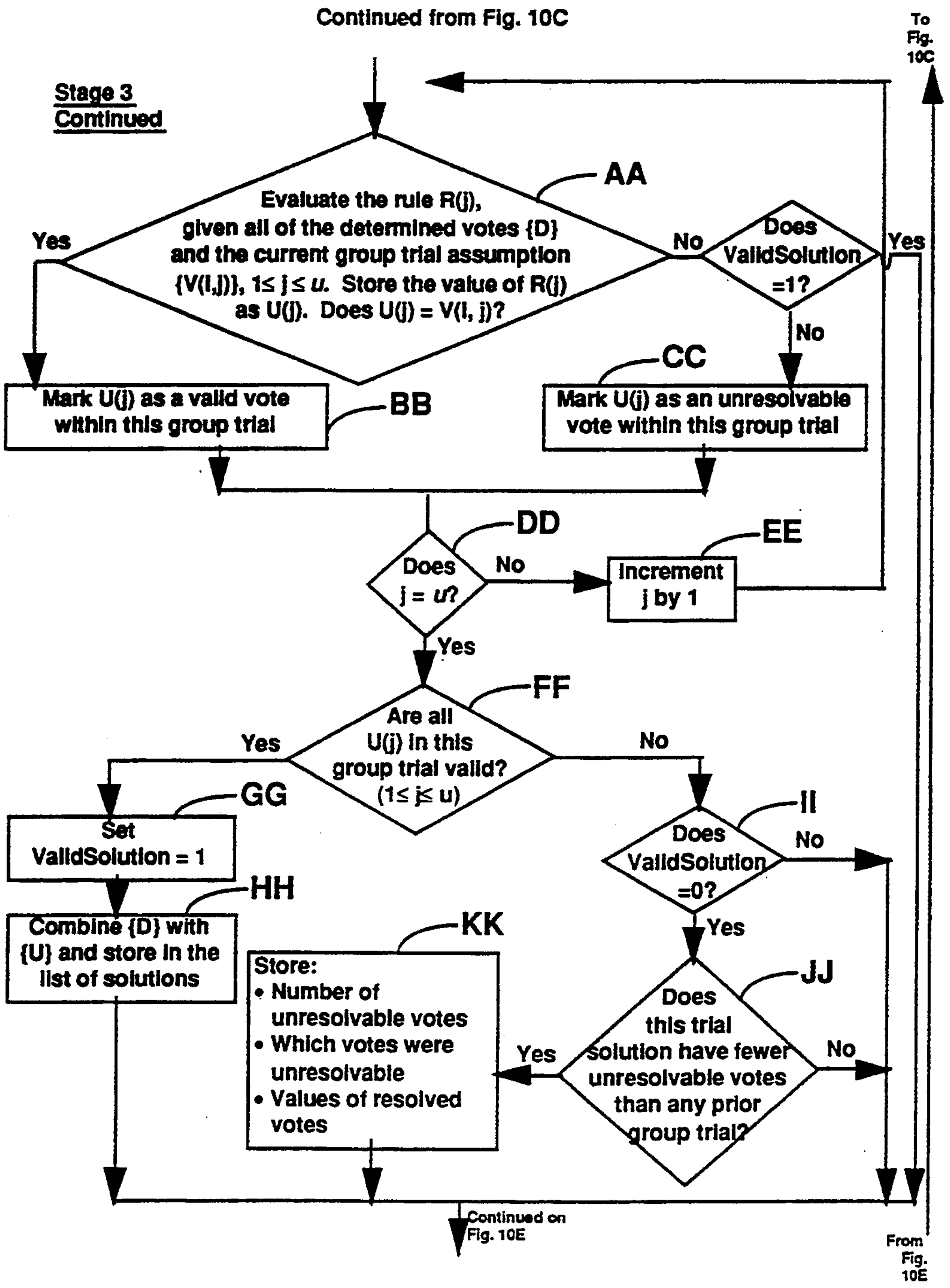
Figure 10E:
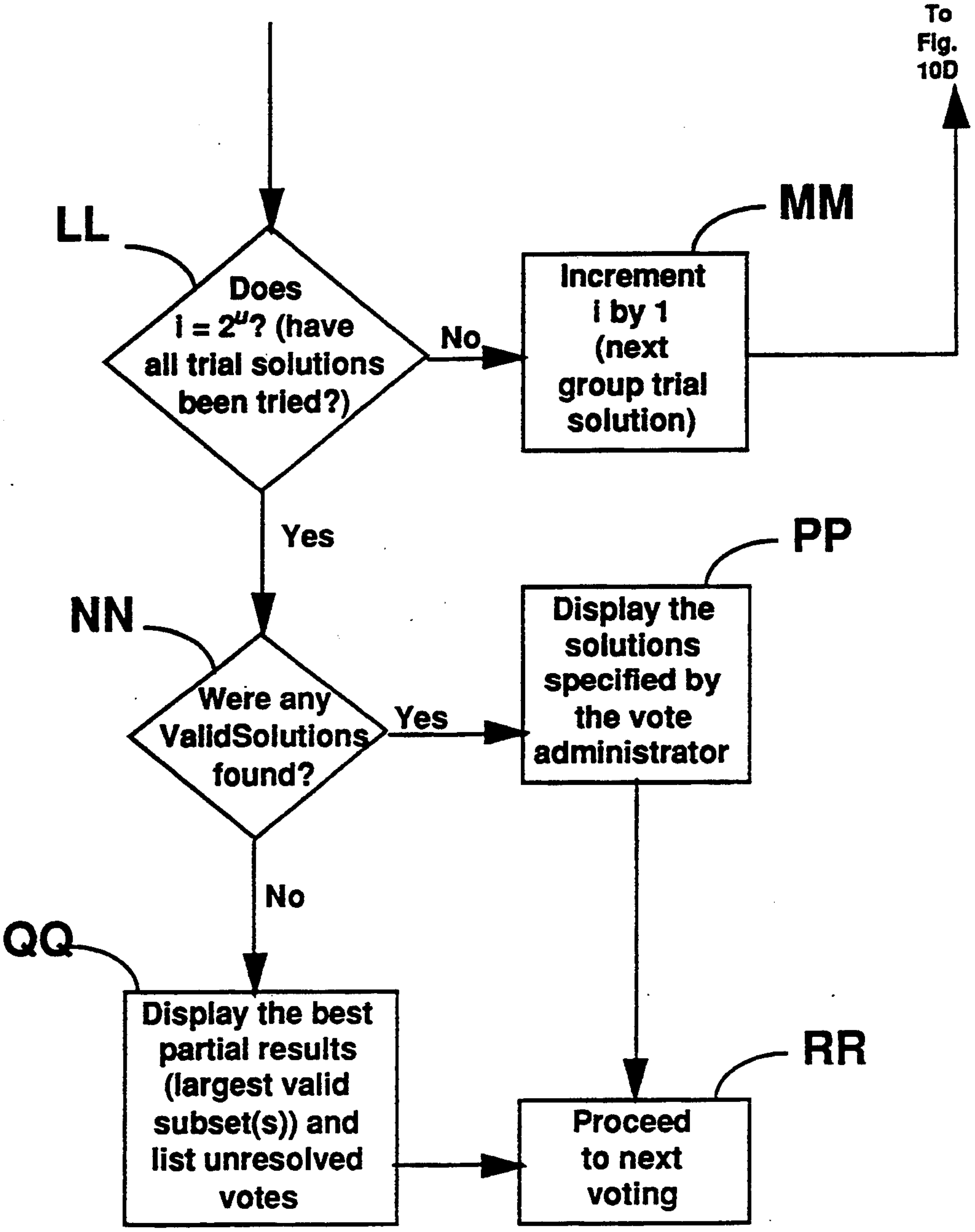

FIGS. 9A–B and 10A–E detail the three stages of step F in FIG. 3 (step E from FIG. 3 is shown in FIGS. 9A and 10A to provide a frame of reference). FIGS. 10A–E are a more detailed version of FIGS. 9A–B. In brief, the purposes of the three stages are as follows:

Stage 1 (steps H and I)—Assess all unconditional votes (type 1 votes—yes, no, abstain, no vote) and all votes directly or indirectly dependent on those unconditional votes only (some type 2 and 3 votes).

Stage 2 (steps J through L in FIG. 9A; steps P through T in FIG. 10B)—Iteratively determine 1) consensus building vote types and 2) votes dependent on all previously determined votes. Repeat these two steps until no more new votes can be determined.

Stage 3—(steps M through QQ in FIG. 9B; steps V through RR in FIGS. 10C, 10D, and 10E)—Assess any remaining votes (some type 2 and 3) using a trial solution method. Find multiple solutions wherever they apply. Until the first complete valid solution is found, determine the largest valid subset of each trial assumption. Report those complete or partial solutions specified by the terms of the vote.

Stage 1

At the beginning of stage 1 (step H), the system examines the votes in whatever order they happen to be in, and identifies the unconditional ones (yes, no, abstain, no-vote). As the system examines each vote, it also evaluates any conditional votes that have become determinable as a result of unconditional votes now determined. Votes so determined are conditional votes that are dependent only on the unconditional votes. Then the system passes through the list again and evaluates all new votes that are dependent only on the ones previously determined, either conditional or unconditional. This process is repeated until an iteration occurs on which no new votes are determined. If all votes in the group have been determined by this process (step I), the system is finished and the results are displayed. If all votes have not been determined, we proceed to stage 2 (step J in FIG. 9A; P in FIG. 9B).

As an example, a group of 5 people vote as follows. (Note that although the vote types are indicated, the system does not need to recognize or categorize them as such.)

#1: Yes if ≧2 people vote yes, else no (type 2);
#2: Yes if #5 votes yes, else no (type 3);
#3: Yes if #4 votes yes, else no (type 3);
#4: Yes if ≧4 people vote yes, else no (type 3);
#5: Yes (type 1).

On the first pass, only #5 is determined (an unconditional yes vote). On the second pass, #2 is determined (yes). On the third pass, #1 is determined (yes). On the next pass, no new votes are determined, since both #3 and #4 depend on more than just #1, #2, and #5. #3 depends upon #4, and #4 may depend upon either itself or #3. The system proceeds to stage 2.

Alternatively, the system can first order the votes from simplest to most complex conditions. By doing so, fewer passes may be required. For example, the system could first order the above votes as follows:

New #1 (old #5): Yes;
New #2 (old #2): Yes if (new) #1 votes yes, else no;
New #3 (old #3): Yes if (new) #5 votes yes, else no;
New #4 (old #1): Yes if ≧2 people vote yes, else no;
New #5 (old #4): Yes if ≧4 people vote yes, else no.

After ordering as above, on the first pass new votes #1, #2, and #4 (old votes #5, #2, and #1, as before) would be determined. On the next pass, no new votes would be determined, and the system would proceed to stage 2.

Stage 2

At the beginning of stage 2 (J in FIG. 9A, P in FIG. 10B), the system first checks whether there are any votes not yet determined of the form:

Yes if ≧x% of the people vote yes, else no (0≦x<100).

If so, the system computes the consensus building chart (J in both FIGS. 9A and 10B) for as many votes as fit the chart format, to determine as many consensus building votes as possible.

In the case above, there is one vote (new #5=old #4) of the consensus building type that has not yet been determined. Using the new numbering scheme, the system creates the table shown in FIG. 11. The system then reorders the voters (FIG. 12).

Since y(x)≦x for voters #1, #2, #4, and #5, we now know that voter #5 can also support the proposal (i.e., yes is a valid value for the #5 vote), in addition to supporters #1, #2, and #4 already determined. Note that the chart is incomplete because voter #3's vote has not yet been determined at this point. Since a new vote, #5, was determined (step Q), and since all votes have not yet been determined (step R), the system performs step K, which is identical to the second part of step H (FIGS. 9A and 10A). Step K evaluates any votes dependent only on votes previously determined. In step K, we determine #3 (yes) from the newly determined #5 vote (yes). The solution with the most number of yeses (all yeses) has now been determined. If requested, the system draws the consensus building chart and presents it to the voters. (If the voting terms specify finding other solutions as well as the one with the most number of yeses, the system will proceed with stage 3 to search for other solutions.)

Stage 3

Unless the terms of the vote specify finding solutions other than the one with the most number of yeses, stage 3 is reached only if undetermined votes remain after stages 1 and 2. Let u be the number of undetermined votes at the end of stage 2. To evaluate these votes, the system generates (step W) and tries (step X) the $2^u$ possible combinations of u votes: (Y,Y . . . Y); (Y,Y . . . N); . . . (N,N . . . N). (If Abstains are allowed, there are $3^u$ possible combinations of u votes: (Y,Y . . . Y); (Y,Y . . . A); (Y,Y . . . N); . . . (N,N . . . N).) These combinations are called group trial assumptions or, if they satisfy all of the votes' conditions, group trial solutions.

There are two nested main logic loops in stage 3, a larger outer loop and a smaller inner loop. The outer loop tests a particular group trial assumption. This outer loop starts after step X and ends at step MM (FIG. 10E), at which point counter i is incremented for the next group trial assumption. (Counter i is initialized in step X). The inner loop tests a single undetermined vote within the larger group trial. This inner loop starts at step AA and ends at step EE, at which point counter j is incremented for the next undetermined vote within the larger group trial. (Counter j is initialized in step Y). If u is the number of undetermined votes, there will be up to u circuits of the inner loop for each circuit of the outer loop.

Step AA tests whether the conditions of a particular undetermined vote are met by the current group trial assumption. If so, control passes to BB, where the vote is marked as valid. If not, control passes to CC, where the vote is marked as unresolvable for this group trial.

When all of the votes in a particular group trial have been tested, control passes to step FF, which tests whether the conditions of all of the undetermined votes have been satisfied by the given group trial assumption. If so, the flag "ValidSolution" is set to 1 (GG), and the group trial solution is stored (HH). If the conditions of any undetermined vote are not met by the group trial assumption, control passes to step II. Step II checks whether a complete valid solution has yet been found. If so (ValidSolution=1), control passes directly to step LL to check whether there are any more group trials to be tested, without saving the partial solution (partial solutions are generally of less interest than complete solutions).

If no complete valid solution has been found (ValidSolution=0), control passes from step II to step JJ, which tests whether the group trial has the same or fewer number of unresolvable votes than any prior group trial. If so, the group trial is saved in step KK before control passes to step LL.

Step LL checks whether there are any more group trials to be tested. If so, i is incremented (MM) and the next trial is tested. If not, step NN checks whether any complete solutions were found. If so, the system displays the complete solutions specified by the terms of the vote (PP). If none were complete, the system determines (as described in examples #3 and #4 below) primary and secondary unresolvable votes (QQ) and displays the best partial solution(s).

Example #1

The following example of a group of eight voters requires going through stages 1 through 3 of the voting system. To avoid multiple iterations in stage 1, the votes have been ordered in an optimal way. This does not affect the result. The group votes are as follows:

#1: Yes

#2: Yes if and only if #1 votes yes
#3: Yes if and only if 3 or more people vote yes
#4: Yes if and only if #3 votes yes
#5: Yes if and only if 5 or more people vote yes
#6: Yes if and only if #5 votes yes
#7: Yes if and only if 8 people vote yes
#8: No if #7 votes yes, else yes As mentioned above, all conditions not explicitly described as unconditional may be either conditional or unconditional. FIG. 13 shows the step at which each vote is determined. In this figure, the bold votes (Y) indicate new votes determined in that step.

In stage 3 of this example, four group trial assumptions are considered for votes #7 and #8 (FIG. 14): YY, YN, NY, NN. Only one of the four combinations, #7=no, #8=yes, meets both sets of constraints. The solution is unique. In FIG. 14, a check mark (√) indicates that the vote condition was met by the group trial assumption, while an x (X) indicates that the condition was not met.

Working through the problem, as illustrated in FIG. 14, group trial assumption 1 is #7=Y, #8=Y. This trial satisfies the condition for vote #7 (first passes of step AA and BB)—"all 8 votes in the group are yes"—but fails the condition for vote #8 (second pass of step AA, first pass of step CC)—"no if #7 is yes". Since not all trial solutions have been tested (DD), i is incremented by 1 (EE) and the next trial solution is tried. After a similarly unsuccessful test of group trial assumption 2, group trial assumption 3 (#7=No, #8=Yes) is tried which satisfies the conditions of both voters #7 and #8. The ValidSolution flag is set equal to 1 (GG). The solution for voters #7 and #8 is combined with the results for the previously determined votes #1 through #6 (denoted {D} in step HH) and stored. After the remaining trial assumption 4 is tried (unsuccessfully), the unique solution (seven yeses, one no) is displayed as specified by the voting terms.

Example #2

This group of four votes is evaluated entirely in stage 3:

#1: Yes if and only if all four votes are yes
#2: Yes if and only if all four votes are yes
#3: Yes if and only if all four votes are yes
#4: Same as #3

The $2^4=16$ group trials evaluated are (Y,Y,Y,Y) through (N,N,N,N). Of these, (Y,Y,Y,Y) and (N,N,N,N) are the two complete valid solutions. Most likely, (Y,Y,Y,Y) would be the preferred solution.

Example #3

This set of five votes has no complete or even partial solution:

#1: vote same as #2
#2: vote opposite of #1
#3: vote same as #1
#4: vote same as #3
#5: vote as the majority of (#2, #3, and #4)

Votes #1 and #2 are opposite each other, and the remaining votes all depend on those conflicting votes. The set of votes is assessed entirely in stage 3. The $2^5=32$ group trials evaluated are (Y,Y,Y,Y,Y) through (N,N,N,N,N).

As usual, for all group trials, we test whether every vote's condition is directly satisfied by that trial. For example, all of the votes in the example except #2's are satisfied by (Y,Y,Y,Y,Y) (vote #2 should be the opposite of #1, which it is not). After testing all of the trials in this way, we identify those with the fewest number of unresolvable votes. The unresolvable votes in this set of best trials are called the primary unresolvable votes or the unresolvable kernel. In the current example, at this first step, no trials have no unresolvable votes, but four trials have only one unresolvable vote each. In each trial, the unresolvable vote is either #1 or #2. FIG. 15 shows these four trials, and identifies votes #1 and #2 as the unresolvable kernel. In this figure, the unresolvable votes are marked by a strikethrough (-), the yes votes by a Y, and the no votes by a N.

When none of the group trials produces a complete valid solution, finding the best partial solution has a second step: checking which votes are dependent on the unresolved votes. These votes are also unresolvable. In best trial 1 (FIG. 15), for example, vote #1 is dependent on vote #2, which is unresolvable. So #1 is unresolvable. And since all of the other votes in trial 1 are dependent upon #1 and #2, they, too, are unresolvable. These votes are called secondary unresolvable votes. A similar analysis of best trials 2, 3, and 4 shows that all of the votes in FIG. 15 are unresolvable (FIG. 16). The dash mark (-) in FIG. 16 indicates an unresolvable vote.

The system reports that votes #1 and #2 are primary unresolvable votes, and that there are no partial solutions. Either voter #1 or voter #2, or both, must change their votes so as not to be opposed to each others' votes to make even a partial solution possible.

Example #4

This set of four votes, similar to example #3, has no complete solution, but does have partial solutions. The four votes are:

#1: vote same as #2
#2: vote opposite of #1
#3: vote same as #4
#4: vote same as #3

Votes #1 and #2 are unresolvable, and votes #3 and #4 have multiple solutions. The set of votes is assessed entirely in stage 3. The $2^4=16$ group trials evaluated are (Y,Y,Y,Y) through (N,N,N,N).

No trials in this example yield complete valid solutions, but eight trials have only one unresolvable vote each, either #1 or #2. FIG. 17 shows these eight trials, and identifies votes #1 and #2 as the unresolvable kernel. Once again, the unresolvable votes are marked by a strikethrough (-), the yes votes by a Y, and the no votes by a N.

In the second step, the votes are checked for dependency on the unresolved votes, which would also be unresolvable. There are no such votes. Assuming the best result is the one with the most yeses, then the best result would be:

#1: Primary unresolvable vote (or unresolvable kernel)
#2: Primary unresolvable vote ( or unresolvable kernel)
#3: Yes
#4: Yes The system reports that there are no complete solutions, that votes #1 and #2 are primary unresolvable votes, and that the best partial solution is as shown above. Either voter #1 or voter #2, or both, must change their votes to make a complete solution possible.

Vote Administration

Before a voting can occur, the terms and conditions under which it is to take place must be set. This is the job of vote administrator 26. The vote administrator may be the same or different from the proposal originator. The vote administrator specifies the following:

Proposition: Statement of the proposal or question on which the group is voting.

Membership: Who is in the voting group.

Acceptance criteria: What constitutes acceptance of the proposition? Greater than 50%? Two-thirds majority? Unanimous? Any percentage can be specified. If the purpose of the vote to identify the largest coalition(s) that support the proposal, acceptance criteria are optional. If used, acceptance criteria can specify the minimum number or percent of members that must be in the coalition for the overall group to acknowledge/accept the coalition. The system will typically identify the largest coalition or coalitions (if there are more than one of equal or near equal size) that supports the proposal.

Vote iterations and deadline: A conditional voting will typically be an iterative process with feedback provided. The iterations may be either of two types:

i) Discrete—A succession of discrete, scheduled votes are conducted, usually at regular intervals, until a certain deadline is reached. Updated vote results are provided to the users immediately after each iteration. Voters may change their votes any number of times before each scheduled vote without effecting the feedback of that vote; only the vote cast at the scheduled voting time effects the feedback. Similarly, voters may change their votes any number of times in the scheduled votes before the final vote is conducted. Only the vote cast in the final voting is counted. The administrator may specify that votes be cast near simultaneously, within some narrow specified time interval.

ii) Continuous—On-going voting process during which feedback is provided continuously. Only the vote cast at the time of the deadline counts.

Allowability of modified proposals: The administrator 26 can specify whether modifications of an original proposal/question may be put forward by members of the group, and if so, under what circumstances. Modifications can be allowed only if first approved by:

i) The group administrator ii) Some number or percent of the group iii) The proposal originator iv) Any combination of the above Allowed vote types: Unconditional yes, no, abstain and no-vote comprise the simplest set of votes. If conditional votes are also allowed, they may include: 1) conditional only on the votes of people who vote unconditionally; 2) conditional only on the number of votes cast the same way, conditionally or unconditionally; 3) conditional on the votes of specific people cast the same way, conditionally or unconditionally (e.g. I will vote yes if and only if at least two of A, B and C vote yes); 4) conditional on either the number of people or specific people voting either the same way or the opposite way, with or without qualification (e.g. if A votes yes, I will vote no; if A votes no, I will vote yes); 5) any combination of the above. In addition to simple yes, no, and abstain votes with or without conditions, allowed votes may include prioritized lists of alternatives, with or without conditions.

Vote weightings: whether all votes will be weighted equally or some votes weighted differently from each other. The default weighting of a vote is 1.0. If voter x's vote is weighted by the factor W(x), $0 \leq W(x)$, then voter x's vote will be treated as W(x) separate votes in final tabulations of all of the votes.

Blocking: Whether voters can "block" other voters from including the former's votes in the latter's conditions.

Displayed results: In the alternatives below, "yes" can be replaced by "no", if so specified by the vote administrator.

Unique or multiple complete solutions:

1. The best solution, if more than one solution (i.e. the one with the most number of yeses)
2. All complete valid solutions, listed in order of descending number of yeses
3. Any specified number of the top best solutions from list 2 above, listed by descending number of yeses
4. All solutions in which the yes votes are not a strict subset of the yes votes of another solution
5. Any specified number of the top best solutions from list 3 above, listed by descending number of yeses
6. The consensus building chart; with either names, name codes, or neither; presented in either numbers of voters or percent of the group
7. Any combination of the above alternatives (including alternatives based on both yeses and nos)

Partial solutions only:

i) Best partial solutions ii) Primary unresolvable votes iii) Secondary unresolvable votes Handling of unresolvable votes:

i) Identified to casters of unresolvable votes only ii) Identified to all voters Additional information, such as the breakdown of votes by various voter categories, can also be displayed.

Output confidentiality: Whether the voters are to be fully identified, end-result identified, fully anonymous, labelled, or probabilistically anonymous.

"Fully identified" means that all votes, including the conditions upon which the votes are based, are available to everyone.

"End-result identified" means that the final result (yes, no, abstain, indeterminate, and non-vote) of everyone's vote is identified with that voter, but not the conditions the voter specified which led to the final result.

"Fully anonymous" means that only simple vote tallies—the number of yes, no, abstain, and indeterminate votes, and the number of non-voters—are made available to everyone.

"Labelled" means that voters are identified throughout the voting process by means of labels, that allow their behavior to be tracked but not the voters identified.

"Probabilistically anonymous" means that the vote administrator can specify a probability P, $0 \leq P \leq 1$. The vote information made available to the voters is the same as "fully anonymous" or "labelled", depending upon the choice of the administrator, with probability 1-P, and is the same as "fully identified" with probability P. The probability P may be applied either to the voting group as a whole, or to voters individually and independently, depending upon the choice of the administrator.

The vote administrator can also specify whether any of these confidentiality alternatives may be overridden by individual voters, for example, whether an end user's vote is allowed to remain anonymous even if the general setting is "fully identified."

As will be understood by those familiar with the art, the present invention may be embodied in other specific forms without departing from the spirit or essential characteristics thereof. For example, a single computer could handle the tasks of vote processor, vote administrator, and voting unit. Accordingly, disclosures of the preferred embodiment of the invention is intended to be illustrative, but not limiting, of the scope of the invention which is set forth in the following claims.

What is claimed is:

1. A voting apparatus using a computer system for processing and reporting votes of voters, said voting apparatus comprising:

means for inputting a proposal and a set of terms into said computer system, wherein said inputting means are electrically coupled to said computer system, wherein said proposal requires voting by a group of voters;

a plurality of voting units electrically coupled to said computer system for inputting said votes, each of said voting units comprising a switching means for transmitting voter input signals to said computer system, wherein said voter input signals are selected from a group comprising a first form and a second form, said first form being a conditional input and said second form being an unconditional input;

means for processing each of said voter input signals to determine corresponding computed value signals, said computed value signals selected from a group consisting of:

a first computed signal having a unique value;

a second computed signal having multiple values; and a third computed signal representing no solution;

means for applying said set of terms to the first, second and third computed signals to determine a set of results, said set of results selected from a group comprising at least:

a total of said first computed signals of a first type and of said second computed signals of said first type, wherein said first type is an affirmative value;

a total of said first computed signals of a second type and of said second computed signals of said second type, wherein said second type is a negative value;

a total of said first computed signals of a third type and second computed signals of said third type, wherein said third type is an abstention value;

a first solution comprising all values in a first set having the largest total of the first computed signals of said first type and of the second computed signals of said first type;

a second solution comprising all values in a second set having the largest total of the first computed signals of said second type and of the second computed signals of said second type;

a first series of solutions comprising a plurality of first ordered sets, said first ordered sets being arranged according to the sum of the number of first and second computed signals of said first type;

a second series of solutions comprising a plurality of second ordered sets, said second ordered sets being arranged according to the sum of the number of first and second computed signals of said second type;

a third series of solutions comprising a plurality of third ordered sets, said third ordered sets being arranged according to the sum of first and second computed signals of all of said types; and a display means for presenting said results.

2. The voting apparatus of claim 1 wherein said set of terms comprises:

criteria for selecting a preferred solution from a group of possible solutions;

criteria for selecting a response when no solution is possible;

qualifications which must be met by a voter to be included in said group of voters;

deadlines for inputting voter input signals; and allowed voter input signals.

3. The voting apparatus of claim 1 further comprising:

means for determining if said voter input signals meet said set of terms; and means for rejecting voter input signals which do not meet said set of terms.

4. The voting apparatus of claim 1 wherein said plurality of voting units comprise:

a desktop voting unit;

a mobile voting unit;

a portable voting unit; and a voting unit embedded in a separate computer.

5. The voting apparatus of claim 1 wherein said plurality of voting units are selected from a group comprising a first form and a second form, wherein said first form is a dedicated device and said second form is a general purpose device with multiple function capabilities.

6. The voting apparatus of claim 5 wherein said general purpose device comprises:

a personal computer; and an interactive TV.

7. The voting apparatus of claim 1 wherein said first form and said second form of voter input signals are selected from a group comprising a first type and a second type, said first type being voter input signals that are equally weighted and said second type being voter input signals that are unequally weighted.

8. The voting apparatus of claim 1 wherein said voter input signals of said second form are selected from a group comprising affirmative, negative, and abstention.

9. The voting apparatus of claim 1 wherein said voter input signals of said first form are selected from a group comprising:

voter input signals dependent on said group of voters;

voter input signals dependent on a subset of said group of voters; and voter input signals dependent on an event.

10. The voting apparatus of claim 1 wherein each of said voting units further comprises:

means for receiving output from the computer system, wherein said output includes the proposal, the set of terms, and the set of results; and a display for presenting the output received from the computer system.

11. The voting apparatus of claim 1 wherein said voter input signals further comprise comments and modifications to said proposal.

12. The voting apparatus of claim 1 further comprising controller means, coupled to said computer system and said plurality of voting units, for accepting or rejecting additional voter input signals from an individual voter of said group of voters after an initial voter input signal has been provided by said individual voter, wherein said acceptance or rejection of said additional voter input signals is governed by said set of terms.

13. The voting apparatus of claim 12 wherein said additional voter input signals are provided by said individual voter before said processing of said voter input signals has taken place.

14. The voting apparatus of claim 12 wherein said additional voter input signals are provided by said individual voter after said processing of said voter input signals has taken place.

15. The voting apparatus of claim 12, further comprising means coupled to said controller means, for:

processing additional voter input signals;
determining a new set of results; and
displaying the new set of results.

16. The voting apparatus of claim 1 wherein said voter input signals of said first form include consensus building voter input signals.

17. The voting apparatus of claim 16 further comprising:

means for constructing a consensus building chart; and means for displaying said consensus building chart.

18. The voting apparatus of claim 17 further comprising means of associating an individual voter of said group of voters with the voter input signal of said individual voter.

19. The voting apparatus of claim 1 further comprising:

means for comparing the set of results to a prescribed objective to determine a best solution; and means for displaying the best solution.

20. The voting apparatus of claim 1 further comprising:

means for determining which of said voter input signals can be modified to eliminate computed indeterminate signals;

means for determining which of said voter input signals can be modified to eliminate computed unresolvable signals;

means for determining the form of modification required to eliminate computed indeterminate signals;

means for determining the form of modification required to eliminate computed unresolvable signals;

means for recommending said modifications to an individual voter of said group of voters; and means for recommending said modifications to said group of voters.

21. The voting apparatus of claim 1 further including:

means for determining which voter input signals were most critical in obtaining a prescribed set of results;

means for displaying said most critical voter input signals;

means for determining which voter input signals were least critical in obtaining a prescribed set of results; and means for displaying said least critical voter input signals.

22. The voting apparatus of claim 1 further comprising means for allowing an individual voter of said group of voters to prevent other voters of said group of voters from inputting voter input signals dependent upon the voter input signal of said individual voter.

23. A method of voting using a computer system, the method comprising the steps of:

inputting a proposal and a set of terms into the computer system;

displaying the proposal and the set of terms on a plurality of voting units;

inputting voter input signals into said voting units, wherein said voter input signals are selected from a group comprising a first form and a second form, said first form being a conditional input and said second form being an unconditional input;

transmitting the voter input signals from each voting unit to the computer system through an electrical network;

processing each of said voter input signals to determine corresponding computed value signals, said computed value signals selected from a group consisting of:

a first computed signal having a unique value;

a second computed signal having multiple values; and a third computed signal representing no solution;

applying said set of terms to the first, second and third computed signals to determine a set of results, said set of results selected from a group comprising at least:

a total of said first computed signals of a first type and of said second computed signals of said first type, wherein said first type is an affirmative value;

a total of said first computed signals of a second type and of said second computed signals of said second type, wherein said second type is a negative value;

a total of said first computed signals of a third type and second computed signals of said third type, wherein said third type is an abstention value;

a first solution comprising all values in a first set having the largest total of the first computed signals of said first type and of the second computed signals of said first type;

a second solution comprising all values in a second set having the largest total of the first computed signals of said second type and of the second computed signals of said second type;

a first series of solutions comprising a plurality of first ordered sets, said first ordered sets being arranged according to the sum of the number of first and second computed signals of said first type;

a second series of solutions comprising a plurality of second ordered sets, said second ordered sets being arranged according to the sum of the number of first and second computed signals of said second type;

a third series of solutions comprising a plurality of third ordered sets, said third ordered sets being arranged according to the sum of first and second computed signals of all of said types; and presenting said results.

24. The method according to claim 23 further comprising the steps of:

determining if said voter input signals meet said set of terms; and rejecting said voter input signals that do not meet said set of terms.

25. The method according to claim 23 wherein said voter input signals of said second form are selected from a group comprising affirmative, negative, and abstention.

26. The method according to claim 23 wherein said first form and said second form of voter input signals are selected from a group comprising a first type and a second type, said first type being voter input signals that are equally weighted and said second type being voter input signals that are unequally weighted.

27. The method according to claim 23 wherein said voter input signals of said first form are selected from a group comprising:

voter input signals dependent on said group of voters;

voter input signals dependent on a subset of said group of voters; and voter input signals dependent on an event.

28. The method according to claim 23 wherein said voter input signals further comprise comments and modifications to said proposal.

29. The method according to claim 23 wherein said set of terms comprises:

criteria for selecting a preferred solution from a group of possible solutions;

criteria for selecting a response when no solution is possible;

qualifications which must be met by a voter to be included in said group of voters;

deadlines for inputting voter input signals; and allowed voter input signals.

30. The method according to claim 23 further comprising the step of accepting or rejecting additional voter input signals from an individual voter of said group of voters after an initial voter input signal has been provided by said individual voter, wherein said acceptance or rejection of said additional voter input signals is governed by said set of terms.

31. The method according to claim 30 wherein said additional voter input signals are provided by said individual voter before said processing of said voter input signals has taken place.

32. The voting apparatus of claim 30 wherein said additional voter input signals are provided by said individual voter after said processing of said voter input signals has taken place.

33. The method according to claim 30 further comprising the steps of:

processing additional voter input signals;

determining a new set of results; and displaying the new set of results.

34. The method according to claim 23 wherein said voter input signals of said first form include consensus building voter input signals.

35. The method according to claim 34 further comprising the steps of:

constructing a consensus building chart; and displaying said consensus building chart.

36. The method according to claim 35 further comprising the step of associating an individual voter of said group of voters with the voter input signal of said individual voter.

37. The method according to claim 23 further comprising the steps of:

comparing the set of results to a prescribed objective to determine a best solution; and displaying the best solution.

38. The method according to claim 23 further comprising the steps of:

determining which of said voter input signals can be modified to eliminate computed indeterminate signals;

determining which of said voter input signals can be modified to eliminate computed unresolvable signals;

determining the form of modification required to eliminate computed indeterminate signals;

determining the form of modification required to eliminate computed unresolvable signals;

recommending said modifications to an individual voter of said group of voters; and recommending said modifications to said group of voters.

39. The method according to claim 23 further comprising the steps of:

determining which voter input signals were most critical in obtaining a prescribed set of results;

displaying said most critical voter input signals;

determining which voter input signals were least critical in obtaining a prescribed set of results; and displaying said least critical voter input signals.

* * * * *